Feb. 9, 1926. 1,572,186
G. COOK
NEUTRAL POSITION DETECTOR FOR AUTOMOBILE PEDALS
Filed Nov. 16, 1925
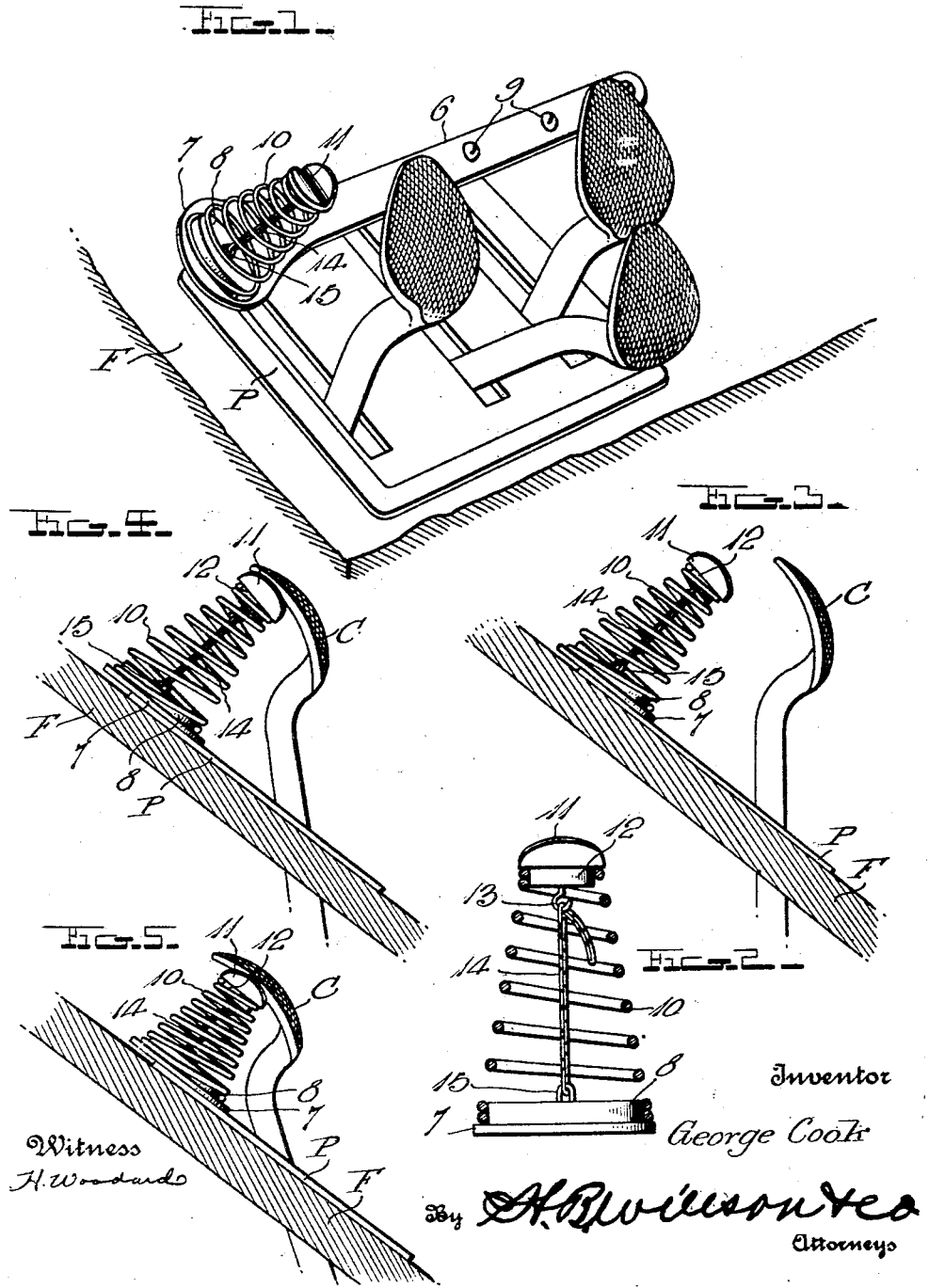
Inventor
George Cook Patented Feb. 9, 1926.

1,572,186

UNITED STATES PATENT OFFICE.

GEORGE COOK, OF DETROIT, MICHIGAN.

NEUTRAL-POSITION DETECTOR FOR AUTOMOBILE PEDALS.

Application filed November 16, 1925. Serial No. 69,473.

*To all whom it may concern:*

Be it known that I, GEORGE COOK, a citizen of the United States, residing at Detroit, in the county of Wayne and State of Michigan, have invented certain new and useful Improvements in Neutral-Position Detectors for Automobile Pedals; and I do declare the following to be a full, clear, and exact description of the invention, such as will enable others skilled in the art to which it appertains to make and use the same.

The transmission mechanism of the Ford automobile, as well known, includes a single pedal for controlling the high and low speed and the clutch of the machine, and this pedal must be forced forwardly from its normal running or high speed position, to a neutral position in order to disengage the clutch and permit stopping of the machine. Forcing of the pedal forwardly beyond neutral position, throws the machine into low gear and it is very difficult, particularly for beginners, to stop the pedal at the neutral position, when it is necessary to throw the clutch out. Thus, there is a great element of danger in connection with learning to drive the Ford and such element obtains also to some extent even with experienced drivers. It is one object of my invention however to overcome this difficulty by the provision of a simple and inexpensive, yet an efficient and desirable check which readily detects for the operator when the clutch pedal is in neutral.

It may be further explained that the neutral position is not always the same, but varies according to wear on certain transmission parts. Hence, a further aim of the invention is to provide novel means whereby the check may be adjusted as occasion may demand.

A still further aim is to provide a check which will not interfere with forward movement of the pedal beyond neutral position when it is desired to throw the machine into low gear.

With the foregoing in view, the invention resides in the novel subject matter hereinafter described and claimed, the description being supplemented by the accompanying drawing.

Figure 1 is a perspective view showing the relation of the invention with the usual set of pedals of a Ford automobile.

Figure 2 is a sectional view through the invention.

Figures 3, 4 and 5 are sectional views partly in elevation showing the relations of parts when the combined clutch and speed controlling pedal is respectively in high speed position, neutral position, and low speed position.

In the drawing above briefly described, the three conventional foot pedals C, B and R have been shown passing through the usual slots in the floor boards F. The pedal C is the one which controls the clutch as well as the low and high speeds of the machine. The normal running or high speed position of this pedal is at the rear extremity of its movement, as shown in Figs. 1 and 3, and to disengage the clutch, the pedal must be forced forwardly to the neutral position disclosed in Fig. 4 whereas to throw the machine into low gear, said pedal must be forced forwardly beyond neutral, as disclosed in Fig. 5. My invention enables the operator, even though he be a novice, to readily determine when the pedal C is in clutch-releasing or neutral position, and the preferred form of such invention has been herein disclosed, with the understanding however, that numerous variations may be made, even though the construction which has been illustrated, will be rather specifically described.

The numeral 6 designates an attaching base which is preferably horizontally elongated as shown, said base being enlarged at one end as indicated at 7 and having an upward projection 8 at said end, while at its opposite end and at suitable points in its intermediate portion, said base is formed with openings to receive screws or the like 9, by means of which it may be secured to the floor boards F. The base is preferably of such a length as to permit the fasteners 9 to engage the floor boards to the right of the usual slotted plate P under the foot pedals.

A conical coiled spring 10 has its base portion disposed around the projection 8 of the base 6, the upper end of this spring being provided with a check member 11 which is disposed in the forward path of the pedal C and is so shaped as to effectively engage said pedal and hold the spring against lateral yielding, when the pedal reaches the neutral position shown in Fig. 4. The check member 11 is provided with a downward projection 12 fitting within the upper end of the spring 10 and equipped with a hook 13.

This hook is engageable with any of the upper links of a small chain 14 which is disposed within the spring 10 and has its lower end anchored at 15 to the projection 8 of the base 1. By properly adjusting the chain 14 to vary its effective length, it will be seen that the check member 11 may be disposed at the exact point at which its use is desired, to engage the pedal C, when the latter is in its true neutral position.

The pedal C may be moved without any unusual retardation from the high speed position of Figs. 1 and 3 to the neutral position of Fig. 4, but as soon as it engages the check 11, the operator feels the resistance of the spring 10 and is hence immediately notified that the pedal is in neutral. He may then apply his brake without danger of choking the motor and the machine will be effectively brought to a standstill, whereas with the ordinary arrangement of pedals, if the pedal C be forced forwardly beyond neutral, the machine is thrown into low gear and application of the brake will stall the motor when stopping the machine. Moreover, when this pedal is accidentally moved into low speed position instead of neutral, the machine pulls ahead with still greater force until it feels the action of the brake, often causing serious accident when in reality the operator meant to bring the machine to a standstill.

After checking of the pedal C in neutral position, if it is desired "to go into low", said pedal is forced forwardly to the position of Fig. 5, during which movement, the spring 10 compresses and does not materially resist the operator's foot. When the pedal is released from the position of Fig. 5 to allow it to rearwardly shift into high, the spring 10 assists in giving an initial rearward impulse to said pedal.

The form of construction herein disclosed has proven to be very desirable and is preferably followed. However, as above stated, numerous variations may be made within the scope of the invention as claimed.

I claim:

1. In a neutral position detector for the combined clutch, low and high speed pedal of an automobile; a yieldable check and means for mounting it in the forward path of the pedal in position to be struck by said pedal when in its neutral position, said check being yieldable with the pedal when the latter is forced forwardly beyond said neutral position.

2. A structure as specified in claim 1; said check consisting of a coiled compression spring adapted to be compressed by said forward forcing of the pedal.

3. A structure as specified in claim 1; said check consisting of a coiled compression spring adapted to be compressed by said forward forcing of the pedal, and adjustable means for limiting the distention of the spring.

4. In a neutral position detector for the combined clutch, low and high speed pedal of an automobile; a compression spring having at one end an attaching base adapted to be secured to the floor boards of the automobile in advance of the pedal, a check member engaging the upper end of the spring and adapted for engagement with the pedal when the latter reaches its neutral position, and a flexible element connected with the base and the check member to limit the distention of the spring, the connection at one end of said flexible element being adjustable for varying the effective length of said element.

5. A structure as specified in claim 4; said check member and base having means for holding the spring against lateral movement with respect thereto, said flexible element being located within the spring.

6. In a neutral position detector for the combined clutch, low and high speed pedal of an automobile; a yieldable check operatively related with the pedal and adapted to function when said pedal reaches neutral position, thereby yieldably resisting further forward movement of the pedal until greater force is applied.

In testimony whereof I have hereunto affixed my signature.

GEORGE COOK.